United States Patent [19]

Frisch et al.

[11] 4,235,977
[45] Nov. 25, 1980

[54] CROSS-LINKED POLYURETHANE ELASTOMERS AND MICROCELLULAR FOAMS

[75] Inventors: Kurt C. Frisch, Detroit, Mich.; Daniël M. J. Tummers; Anne Te Nijenhuis, both of Geleen, Netherlands

[73] Assignee: Stamicarbon, B.V., Geleen, Netherlands

[21] Appl. No.: 17,282

[22] Filed: Mar. 5, 1979

[30] Foreign Application Priority Data

Mar. 4, 1978 [NL] Netherlands .......................... 7802413

[51] Int. Cl.³ ...................... C08G 18/14; C08G 18/32
[52] U.S. Cl. ..................................... 521/166; 528/73; 528/75; 528/906
[58] Field of Search .......................... 521/166; 528/73

[56] References Cited

U.S. PATENT DOCUMENTS

| 2,052,490 | 8/1936 | Reinhardt et al. | 264/46.3 |
| 3,174,950 | 3/1965 | Cordier | 528/73 |
| 3,730,923 | 5/1973 | Formaini et al. | 521/166 |
| 4,031,040 | 6/1977 | DenOtter et al. | 521/166 |
| 4,063,020 | 12/1977 | DenOtter et al. | 528/73 |

FOREIGN PATENT DOCUMENTS 1080487 8/1967 United Kingdom ...................... 521/166

OTHER PUBLICATIONS

Saunders et al. Polyurethanes, Part I, Interscience, N.Y. (1962), pp. 32–48.

*Primary Examiner*—H. S. Cockeram
*Attorney, Agent, or Firm*—Cushman, Darby & Cushman

[57] ABSTRACT

Cross-linked polyurethanes such as solid elastomeric polyurethanes or microcellular polyurethanes are prepared by reacting a polyisocyanate, one or more polyols and at least one trihydroxy compound in the presence of a catalyst using, as the hydroxyl compounds a low molecular weight diol, optionally a polymeric polyol and tris-($\beta$-hydroxypropyl)-isocyanurate or ethoxylated tris-($\beta$-hydroxypropyl)-isocyanurate all present in specific ranges of proportions. Use of the specific isocyanurates provides for better utilization and smaller quantities of the blowing agent used to make microcellular polyurethane foams.

19 Claims, No Drawings

CROSS-LINKED POLYURETHANE ELASTOMERS AND MICROCELLULAR FOAMS

The invention relates to cross-linked polyurethanes and processes for their preparation, particularly elastomers and microcellular foams.

It is known that cross-linked polyurethanes can be obtained by the reaction of a polyisocyanate, one or more polyhydroxy compounds, and at least one trihydroxy compound which acts as a cross-linking agent. Cross-linking agents primarily used in this process are compounds such as trimethylolpropane or glycerol, or an alkylene oxide adduct of these compounds.

Although in this way satisfactory products can be obtained, it is of importance to have available products with improved physical properties, especially strength, which better retain their properties at elevated temperatures.

According to the present invention, cross-linked polyurethanes are prepared by reacting a polyisocyanate, one or more polyols and at least one trihydroxy compound, optionally in the presence of a catalyst and other usual additives, when the following hydroxyl compounds are included generally within the proportions indicated:

A-1. A polymeric polydroxy compound having a molecular weight of between about 500 and about 10,000;

A-2. A dihydroxy compound having a molecular weight of between about 60 and about 200, in a quantity such that the ratio between the hydroxyl groups derived from the low molecular weight diol and the hydroxyl groups derived from the polymeric polyol (A-1) is between 0:1 and 5:1; and tris-($\beta$-hydroxypropyl)-isocyanurate or ethoxylated tris-($\beta$-hydroxypropyl)-isocyanurate, in a quantity such that the ratio between the hydroxyl groups derived from the tris-($\beta$-hydroxypropyl)-isocyanurate or its ethoxylated derivative and the hydroxyl groups derived from the sum of the polyols (A-1 and A-2) is between 0.5:1 and 5:1.

By using tris-($\beta$-hydroxypropyl)-isocyanurate or its ethoxylated derivative as the cross-linking agent it is possible to obtain products exhibiting substantially improved physical properties at room temperature—particularly tensile strength and tear strength—and at elevated temperature products having a reduced loss in weight and strength under such conditions.

According to the present invention, tris ($\beta$-hydroxypropyl)-isocyanurate or its ethoxylated derivative is used as the cross-linking agent. Tris ($\beta$-hydroxypropyl)-isocyanurate can be obtained by reacting propylene oxide with cyanuric acid, preferably in the absence of a catalyst. The ethoxylated derivative is obtained by reacting from one to about three moles of ethylene oxide with one mole of tris ($\beta$-hydroxypropyl) isocyanurate, so that one, two or three hydroxypropyl groups are converted to hydroxyethyl-oxypropyl groups. The ethoxylated compound is slightly more reactive, due to the presence of primary hydroxyl groups. Use of ethoxylated tris-($\beta$-hydroxypropyl) isocyanurate is especially advantageous in the preparation of polyurethanes by reaction injection molding.

In general, the quantity of tris-($\beta$-hydroxypropyl)-isocyanurate or the ethoxylated derivative thereof is used in an amount such that the ratio between the hydroxyl groups derived from the isocyanurate compound and the hydroxyl groups derived from the polyols (A-1 and A-2) is between 0.5:1 and 5.0:1.

Towards the lower end of these ratios the degree of cross-linking is relatively low, and with a higher ratio of about 5:1 the products show such strong cross-linking that they have relatively low flexibility and impact resistance. In general, better properties are obtained if the ratio referred to above is between 0.8:1 and 3.5:1. The skilled operator will be able to determine the relevant ratio or ratios depending upon the physical properties of the products desired.

At least a portion of the hydroxyl groups is provided by the polymeric polyols (A-1). These compounds have a molecular weight between about 500 and about 10,000 and contain 2 to 5 hydroxyl groups per molecule. Preferably polymeric polyols having 2-3 hydroxyl groups per molecule are used, the triols being especially suitable in reaction injection molding.

Suitable polymeric polyols include the polyoxyalkylene glycols composed of $C_2$ to $C_4$ oxyalkylene units, such as polyethylene glycol, polypropylene glycol, polytetramethylene glycol and random- or block-copolymers of ethylene oxide and propylene oxide; polylactone polyols derived from a $C_5$ to $C_{12}$ lactone, such as obtained by polymerizing caprolactone, valerolactone or oenantholactone in the presence of a polyfunctional initiator; hydroxyl-terminated polyesters; hydroxyl-group containing polyacrylates; hydroxyl group containing graft polymers containing polymer chains based on e.g. acrylonitrile, styrene or combinations thereof; and addition products of ethylene oxide or propylene oxide to a polyfunctional, and preferably trifunctional, hydroxyl compound such as glycerol or trimethylolpropane.

In general, the polyesters have been obtained by reacting one or more $C_4$ to $C_{12}$ aliphatic and/or aromatic carboxyl acids, e.g. adipic acid, azelaic acid, phthalic acid or terephthalic acid, and one or more $C_2$ to $C_{12}$ aliphatic and/or cycloaliphatic diols, e.g. ethylene glycol, diethylene glycol, 1,4-butane diol, 1,6-hexane diol, propylene glycol, or 1,4-(hydroxymethyl)-cyclohexane. Additional polymeric polyols and polyesters will be apparent from the above discussion.

In the preparation of cast elastomers and foams, a polymeric diol with a molecular weight between 500 and 2,500 is preferably used. In reaction injection molding compositions the use of a polymeric triol with a molecular weight of between 2,500 and 10,000, more specifically between 4,000 and 8,000, is preferred.

In certain embodiments of the present invention a low molecular weight diol that can act as chain lengthener is used in addition to the polymeric diol. For instance one may use dihydroxy compounds having a molecular weight of between 60 and 200. Examples are aliphatic unbranched diols such as ethylene glycol, 1,4-butane diol, and 1,6-hexane diol; branched diols such as 1,2-propylene glycol and 2,2-dimethyl-1,4-butane diol; low molecular weight polyalkylene glycols such as diethylene glycol, triethylene glycol; or cycloaliphatic diols such as 1,4-(hydroxymethyl)-cyclohexane or bis-hydroxymethylhydrochinon. By preference, the low molecular weight diol used is an aliphatic diol with 2–6 carbon atoms. When a low molecular weight diol is the appropriate amounts are indicated below.

The polyisocyanates used include the commonly-applied aromatic, aliphatic or cycloaliphatic diisocyanates in their pure or crude forms, e.g. toluene diisocyanates, 4,4'-diisocyanate diphenyl methane, polyarylene polyphenyl isocyanates, isophorone diisocyanate, and hexamethylene diisocyanate. If a crude polyisocyanate is used containing on the average more than two isocyanate groups in the molecule, the amount of cross-linking agent may be lowered accordingly. Also suitable are the polyfunctional isocyanates such as those obtained by the catalytic trimerisation of a diisocyanate or reaction of one mole of a trihydroxy compound or water with three moles of a diisocyanate. The amount of diisocyanate used is such that the overall NCO/OH ratio is about 1:1, and more specifically in the range of about 1.00:1 to 1.05:1.

In general, one or more catalysts are used for accelerating the isocyanate reaction. The most commonly used catalyst types are the polyamino compounds, for instance triethylene diamine and tin-containing compounds, such as dibutyltin diacetate or dilaurate. Other catalysts are described in the relevant literature and will be apparent to the skilled worker.

If desired still other commonly used additives may be present, such as release agents, fillers, pigments, flame extinguishers, and, if microcellular polyurethane is being prepared, blowing agents and surfactants all of which are well known in the art.

The especially preferred aspects of the present invention are the solid elastomeric polyurethanes and the microcellular polyurethanes.

The polyurethane elastomers can be prepared by mixing together the polyisocyanate, the polyol component, the cross-linking agent and the catalyst and then hardening them at an elevated temperature, say between about 75° C. and about 150° C., preferably between 100° C. and 125° C., in a preferably preheated mold. It is also possible first to convert the polyisocyanate and the polymeric polyol at an NCO/OH ratio of at least 2:1 into a prepolymer containing isocyanate groups, and then to mix this prepolymer with the other reaction components. For such prepolymers the use of a polymeric diol with a molecular weight between 600 and 2,000 is preferred. Further, it is possible to first convert the tris-($\beta$-hydroxypropyl)-isocyanurate or the ethoxylated derivative thereof into a prepolymer by reacting it with the polyisocyanate.

In the preparation of the polyurethane elastomers no low molecular weight diol is used or, if present, only a small amount is used. The ratio between the hydroxyl groups derived from the low molecular weight diol and the hydroxyl groups derived from the polymeric polyol is preferably less than 0.5:1. In order to obtain a favorable cross-link density the ratio between the hydroxyl groups derived from the isocyanurate triol and the hydroxyl groups derived from the other polyhydroxy component(s) is preferably between about 1:1 and about 3.5:1.

In another embodiment of the present invention, the various components are reacted in one or more steps in the presence of a relatively small amount of blowing agent. This results in the production of a microcellular polyurethane foam. The proportions and reaction conditions are chosen such that the foam has a density of the order of at least 200 kg/m$^3$ and preferably over 400 kg/m$^3$. In most cases the amount of blowing agent is between 2 and 10% wt., calculated on the total quantity of reactants. The blowing agent may be any of the compounds customarily used for such purpose that form a gas under the reaction conditions employed. Most commonly used blowing agents are those compounds having from 1 to 3 carbon atoms that contain chlorine, fluorine or both. In addition, it is preferred to add one or more of the usual surfactants, in particular silicone mixed polymers, in an amount of between about 0.1 and 5% wt. based on the total quantity of reactants.

We have found that in preparing microcellular polyurethane foams the use of tris-($\beta$-hydroxypropyl)-isocyanurate or its ethoxylated derivative has an additional advantage of better utilization of the blowing agent. Consequently, only relatively small amounts of blowing agent need be used.

The use of a low molecular weight diol in the microcellular polyurethane foams is preferred. In this case preferably the amount of low molecular weight diol is used so that the ratio between the hydroxyl groups derived from this diol and the hydroxyl groups derived from the polymeric polyol is between about 0.5:1 and about 3.0:1, and more particularly between about 1.0:1 and about 2.0:1. Further, the cross-link density may be somewhat lower than in the polyurethane elastomers. In this case it is preferable to use a ratio of between about 0.8:1 and about 2.5:1, and particularly between about 1.0:1 and about 2.0:1, as between the hydroxyl groups derived from the isocyanurate triol and the hydroxyl groups derived from the other hydroxyl component(s).

The microcellular polyurethane foams can be prepared by mixing all components and then foaming and hardening them in a mold, either heated or unheated. Another fully acceptable method is first to react the polymeric polyol, and optionally part of the total amount of cross-linking agent, with an excess amount of polyisocyanate, and next to add the remaining amount of the cross-linking agent, the low molecular weight diol, and further additives as may be desired.

In reaction injection molding compositions, the use of the ethoxylated isocyanurate triol and of a high molecular weight triol is advantageous. In these compositions, the ratio between the hydroxyl groups derived from the polymeric polyol and those derived from the isocyanurate triol is between 0.1:1 and 1:1, and preferably between 0.25:1 and 0.9:1.

Of course, all components must be free of water, and the various reactions are carried out to the extent possible with exclusion of water, unless water is intentionally present as a blowing agent.

The present invention is further explained with reference to the following examples, without being restricted thereto.

EXAMPLE 1

A microcellular polyurethane foam was prepared in the following manner:

An isocyanate component was prepared by first reacting for 3 hours under nitrogen and at a temperature of 70° C. toluene diisocyanate (80% 2,4 and 20% 2,6), poly-(oxytetramethylene)-glycol with a molecular weight of 2062, and a quantity of tris-($\beta$-hydroxypropyl)-isocyanurate not subjected to further oxyalkylation, which is referred to herein as THPIC-13. Next the hydroxyl component was prepared by mixing THPIC-13 with 1,4-butane diol at 100° C. Thereafter the two components were mixed, after which a surface-active silicone preparation (DC-190 of Dow Corning USA), CCl$_3$F as a blowing agent, and triethylene diamine (20% solution in dimethyl amino ethanol) were admixed.

The mixture was transferred to a mold and heated for 12 hours at 100° C. Thereafter each product was conditioned for at least 24 hours at 20° C. and 50% relative humidity. Compositions A, B-1 and B-2 were obtained.

The amounts used in this example were as follows:

| composition | | A | B |
|---|---|---|---|
| THPIC-13 | ⎫ | 440 | 330 |
| polymeric diol | ⎬ NCO component | 2062.5 | 3094 |
| TDI | ⎭ | 1218 | 1218 |
| THPIC-13 | ⎫ | 396 | 396 |
| | ⎬ OH component | | |
| 1,4-butane diol | ⎭ | 180 | 180 |
| NCO component | | 164 | 169.3 |
| OH component | | 25 | 21 |
| DC-190 | | 2 | 2 |
| CCl$_3$F | | 10 | 10 |
| catalyst | | 0.02 | 0.02 (B-1) or 0.05 (B-2) |

EXAMPLE 2

In substantially the same manner as described in example 1 microcellular polyurethane foams C and D were prepared. In both cases the isocyanate component used was an isocyanate product on the basis of 4,4'diisocyanate diphenyl methane (P-90, from Davidson Rubber, USA, NCO content of 22.8%, equivalent number 184.2). Foam D is outside the scope of the invention, as it contained as a cross-linking agent a trimethylol propane propylene oxide adduct (Pluracol-TP 340 of BASF-Wyandotte, USA, having an equivalent number of 101). The amounts used in this example were as follows:

| composition | | C | D |
|---|---|---|---|
| THPIC-13 | ⎫ | 330 | — |
| Pluracol TP-340 | ⎪ | — | 303 |
| | ⎬ OH component | | |
| polymeric diol | ⎪ | 1031.2 | 1031.2 |
| 1,4-butane diol | ⎭ | 67.5 | 67.5 |
| OH-component | | 111.7 | 109.6 |
| P-90 (isocyanate) | | 83.2 | 83.2 |
| DC-190 | | 2.0 | 2.0 |
| CCl$_3$F | | 10.0 | 10.0 |
| catalyst | | — | — |

EXAMPLE 3

The microcellular polyurethane foams obtained as described in Examples 1 and 2 were subjected to a number of tests and observations. The testing methods are described in this specification. The results were compiled and are reported in Table 1.

A comparison of products C and D (not according to the present invention) shows that the use of the specific isocyanurate THPIC-13 leads to a better product. Products B-1 and B-2 differ in that B-1 was hardened in a preheated mold and B-2 in a cold mold. Foam B-2 had a slightly better skin.

TABLE 1

| foam | A | B-1 | B-2 | C | D |
|---|---|---|---|---|---|
| density, kg/cm$^3$ | 439 | 472 | 493 | 408 | 469 |
| hardness, Shore A | 83 | 60 | 60 | 83 | 75 |
| elasticity, Bashore | 27 | 27 | 27 | 29 | 22 |
| tensile strength, N/mm$^2$ | 3.58 | 2.48 | 2.54 | 3.79 | 2.13 |
| elongation, % | 130 | 190 | 190 | 80 | 150 |
| tear strength, mNm | 525 | 438 | 490 | 613 | 525 |
| compressive strength, N/mm$^2$ | | | | | |
| at 10% deflection | 1.44 | 0.47 | 0.49 | 1.84 | 0.43 |
| at 25% deflection | 1.86 | 0.75 | 0.74 | 2.13 | 0.74 |
| at 50% deflection | 3.46 | 1.48 | 1.44 | 3.49 | 1.55 |
| compressive strength after humid aging, % difference | | | | | |
| at 10% deflection | −3 | −21 | −22 | +9 | −6 |
| at 25% deflection | −2 | −20 | −22 | +9 | +1 |
| at 50% deflection | −5 | −13 | −16 | +14 | +12 |
| compressive strength after dry aging, % difference | | | | | |
| at 10% deflection | +19 | −12 | −6 | +29 | 0 |
| at 25% deflection | +19 | −11 | +1 | +32 | +4 |
| at 50% deflection | +14 | 0 | +12 | +36 | −3 |

EXAMPLE 4

A number of polyurethane elastomers were prepared by mixing a polymeric diol at 140° C. with a cross-linking agent and thereafter admixing a polyisocyanate (P-90, as used in Example 2). Next an amine catalyst (PC-41 of Abbott Laboratories, USA) and dibutyl tin dilaurate were admixed, and hardening was effected for 30 minutes first in a press and then for 12 hours in a furnace.

The amounts used are shown in Table 2.

NIAX-34-28 is a polyol (available from Union Carbide, USA) containing styrene and acrylonitrile units and having an equivalent number of 2040 and an OH number of 27.5. Pluracol P-380 (BASF-Wyandotte) is a polyol having an equivalent number of 2235 and an OH number of 25.1. THPIC-16 designates the addition product of 6 moles of propylene oxide to one mole of cyanuric acid, having a hydroxyl number of 376 and an equivalent number of 149.2.

All elastomers were conditioned for at least a week at 20° C. at 50% relative humidity after which several mechanical properties were determined both at room temperature and at elevated temperature. The results have been compiled in Tables 3 and 4. In general, the elastomers prepared with THPIC-13 (4-1 through 4—4 and 4-8 through 4-12) have slightly better chracteristics. In all cases the elastomers show very good results in the sagging test.

TABLE 2

| elastomer | NIAX-34-28 | Pluracol P-380 | THPIC-13 | THPIC-16 | P-90 | amine cat. | tin cat |
|---|---|---|---|---|---|---|---|
| 4-1 | 200 | — | 20 | — | 52.75 | 0.3 | 0.02 |
| 4-2 | 200 | — | 20 | — | 78.36 | 0.5 | 0.02 |
| 4-3 | 200 | — | 30 | — | 69.29 | 0.3 | 0.02 |
| 4-4 | 200 | — | 30 | — | 98.99 | 0.5 | 0.02 |
| 4-5 | 200 | — | — | 20 | 43.14 | 0.3 | 0.02 |
| 4-6 | 200 | — | — | 20 | 61.63 | 0.5 | 0.02 |
| 4-7 | 200 | — | — | 30 | 56.39 | 0.3 | 0.02 |
| 4-8 | 200 | — | — | 30 | 80.55 | 0.5 | 0.02 |
| 4-9 | — | 200 | 20 | — | 51.14 | 0.3 | 0.02 |
| 4-10 | — | 200 | 20 | — | 73.05 | 0.5 | 0.02 |
| 4-11 | — | 200 | 30 | — | 68.28 | 0.3 | 0.02 |
| 4-12 | — | 200 | 30 | — | 97.55 | 0.5 | 0.02 |
| 4-13 | — | 200 | — | 20 | 42.13 | 0.3 | 0.02 |
| 4-14 | — | 200 | — | 20 | 60.19 | 0.5 | 0.02 |

TABLE 2-continued

| elastomer | NIAX-34-28 | Pluracol P-380 | THPIC-13 | THPIC-16 | P-90 | amine cat. | tin cat |
|---|---|---|---|---|---|---|---|
| 4-15 | — | 200 | — | 30 | 54.77 | 0.3 | 0.02 |
| 4-16 | — | 200 | — | 30 | 78.26 | 0.5 | 0.02 |

TABLE 3

| elastomer | 4-1 | 4-2 | 4-3 | 4-4 | 4-5 | 4-6 | 4-7 |
|---|---|---|---|---|---|---|---|
| hardness, Shore-D | 35 | 38 | 42 | 55 | 26 | 38 | 32 |
| tensile strength at 25°C., N/mm$^2$ | 11.99 | 10.22 | 16.15 | 20.06 | 10.57 | 6.94 | 12.84 |
| tensile strength at 150° C., N/mm$^2$ | 1.97 | 1.68 | 1.60 | 2.41 | 1.84 | 2.03 | 1.61 |
| elasticity modulus at 50%, N/mm$^2$ | 2.57 | 4.99 | 6.07 | 14.59 | 1.81 | 3.26 | 2.22 |
| rupture resistance, N/mm$^2$ | 11.99 | 10.22 | 16.15 | 20.06 | 10.57 | 6.94 | 12.84 |
| elongation of 25° C., % | 243 | 152 | 235 | 100 | 335 | 165 | 306 |
| sagging at 25° C., cm | 3.93 | 3.48 | 2.23 | 0.004 | 4.28 | 2.56 | 4.07 |
| sagging at 120° C., cm | 5.71 | 5.43 | — | — | — | — | — |

TABLE 4

| elastomer | 4-9 | 4-10 | 4-11 | 4-12 | 4-13 | 4-14 | 4-15 |
|---|---|---|---|---|---|---|---|
| hardness, Shore D | 18 | 28 | 30 | 36 | 16 | 25 | 22 |
| tensile strength at 25° C., N/mm$^2$ | 3.44 | 6.91 | 6.03 | 5.88 | 2.02 | 3.35 | 3.31 |
| tensile strength at 150° C., N/mm$^2$ | 10.7 | 1.69 | 1.39 | 1.90 | 1.08 | 1.74 | 1.50 |
| elasticity modulus at 50%, N/mm$^2$ | 1.07 | 3.35 | 3.35 | 4.63 | 0.69 | 1.44 | 15.6 |
| rupture resistance, N/mm$^2$ | 3.44 | 6.91 | 6.03 | 5.88 | 2.02 | 3.35 | 3.31 |
| elongation at 25° C., % | 280 | 160 | 131 | 100 | 223 | 130 | 150 |
| sagging at 25° C. | 5.54 | 2.32 | 1.35 | 1.86 | 6.30 | 2.64 | 2.88 |
| sagging at 120° C. | 5.64 | 4.83 | 3.98 | 2.97 | 6.61 | 4.05 | 5.06 |

EXAMPLE 5

A number of polyurethane elastomers were prepared by first preparing a prepolymer from 2 moles of diisocyanate and 1 mole of polymeric diol and reacting them for 3 hours under nitrogen at 70° C. Thereafter, an amount of prepolymer was mixed vigorously at 100° C. with the equivalent amount of unmodified tris-(β-hydroxypropyl)-isocyanurate (THPIC-13), and subsequent to degassing and the addition of a catalyst (dibutyl tin dilaurate), the mixture was transferred to a preheated mold treated with a release agent. While the pressure was slowly raised to 700 bar, the mixture was heated for 30 minutes at 100° C. (MDI elastomers) or 110° C. (TDI elastomers), and thereafter further hardened in a furnace at 100° C. for 10 and 4 hours, respectively. The polymeric diols used were poly(oxytetramethylene)-glycols having molecular weights of 980 (polymeg 1000 of Quaker Oats, USA) and 662 (Polymeg 650), a polycaprolactone diol having a molecular weight of 1958 (Niax D-560 of Union Carbide, USA), and a polyester glycol having a molecular weight of 2000 (Multrathane R-144 of Mobay, USA). The diisocyanates used were toluene diisocyanate (TDI, 80% 2,4 and 20% 2,6) and 4,4' diisocyanate diphenyl methane (MDI).

All elastomers were conditioned for at least a week at 20° C. and 50% relative humidity. Subsequently a number of mechanical and physical properties were determined. The results of this determination are compiled in Table 5.

In the experiments as described in this example an equivalent number of 110 instead of 101 was erroneously applied for THPIC-13. Consequently, a small excess of hydroxyl groups was used in each case. In spite of the slightly insufficient hardening thus induced, the properties of all products were satisfactory. Concerning the preparation of ethoxylated tris-(β-hydroxypropyl) isocyanurate, we refer to our copending application Ser. No. 4,476, Frisch et al., filed on Jan. 18, 1979, the disclosure of which is hereby incorporated by reference.

TABLE 5

| elastomer | 5-1 | 5-2 | 5-3 | 5-4 | 5-5 | 5-6 | 5-7 |
|---|---|---|---|---|---|---|---|
| Polymeg 1000 | x | | | x | | | |
| Polymeg 650 | | x | | | | | |
| Niax D-560 | | | x | | x | | |
| Multrathane R-144 | | | | x | | | x |
| TDI | x | x | x | x | | | |
| MDI | | | | | x | x | x |
| hardness, Shore A | 62 | 66 | 57 | 59 | 68 | 58 | 60 |
| tensile strength at 25° C., N/mm$^2$ | 10.51 | 27.00 | 20.33 | 21.78 | 22.20 | 18.59 | 22.2 |
| tensile strength after humid aging | 16.80 | 33.00 | 22.41 | 33.01 | 22.20 | 17.99 | 25.4 |
| tensile strength after dry aging | 14.03 | 24.39 | 16.24 | 24.40 | 21.26 | 18.63 | 26.0 |
| tear strength, mNm | 420 | 2452 | 525 | 1296 | 770 | 297 | 525 |
| elasticity, Bashore | 13 | 25 | 53 | 55 | 18 | 36 | 33 |
| modulus at 100% N/mm$^2$ | 1.86 | 3.58 | 1.00 | 2.20 | 2.41 | 1.52 | 1.45 |
| modulus at 300% N/mm$^2$ | 6.40 | 26.90 | 2.41 | 5.79 | 11.65 | 3.31 | 4.82 |
| TGA, weight loss of 5% at .... °C. | 303 | 302 | 307 | 310 | 326 | 329 | 328 |
| 10% at .... °C. | 315 | 317 | 326 | 326 | 338 | 342 | 338 |
| 20% at .... °C. | 328 | 333 | 345 | 353 | 350 | 365 | 366 |

EXAMPLE 6

In the manner described in Example 4 two polyurethane elastomers were prepared from poly(oxytetramethylene)-glycol having a molecular weight of 2062, toluene diisocyanate, and THPIC-13 (elastomer 6-U) or —for comparison and falling outside the scope of the present invention—trimethylol propane, as the crosslinking agent (elastomer 6-V).

The properties are shown below:

| elastomer | 6-U | 6-V* |
|---|---|---|
| tensile strength, N/mm$^2$ | 12.40 | 6.89 |
| tear strength, mNm | 700 | 175 |
| elongation, % | 620 | 400 |

*not according to the invention

EXAMPLE 7

Several polyurethane elastomers were prepared by mixing a high molecular weight triol with a triol containing an isocyanurate group, a catalyst, and in some of the experiments, with butane diol. The mixtures were degassed in vacuo and subsequently the isocyanate was added with intensive mixing. The mixtures were hardened for 30 minutes in a preheated steel mold at 100° C. Thereafter the moldings were released from the mold and subjected to further hardening for 6 hours at 100° C. The samples to be used for measuring the physical properties were conditioned for 7 days at room temperature and 50% relative humidity.

The high molecular weight triol was a polyoxypropylene triol with terminal oxyethylene groups, grafted with styrene and acrylonitrile. The molecular weight was 5968.1, the equivalent weight 1989.4, and the hydroxyl number 28.2. The polyol containing the isocyanurate group was tris($\beta$-hydroxypropyl) isocyanurate (THPIC-13) or an addition product of ethylene oxide to this polyol (THPIC-13 EO). The latter polyol had a molecular weight of 476.4, an equivalent weight of 155.8, and a hydroxyl number of 360. The polyisocyanate was the P-90 also used in Example 4, which was added in an amount such that the NCO/OH ratio was 1.05.

The catalysts used were 0.0075% wt. of a tertiary amine (Polycat 41) and 0.1% wt. of dibutyl tin dilaurate.

TABLE 6

| experiment no. | 7-1 | 7-2 | 7-3 | 7-4 |
|---|---|---|---|---|
| high m.w. triol | 85 | 85 | 85 | 85 |
| THPIC-13 | 15 | 7.5 | — | — |
| THPIC-13 EO | — | — | 15 | 7.5 |
| butane diol | — | 7.5 | — | 7.5 |
| hardness, Shore A | 92 | 96 | 83 | 95 |
| hardness, Shore D | 51 | 62 | 33 | 54 |
| tensile strength, N/mm$^2$ | 14.0 | 22.2 | 11.3 | 20.1 |
| elongation, % | 170 | 220 | 205 | 240 |
| elasticity modulus at 100%, N/mm$^2$ | 8.4 | 12.1 | 5.1 | 8.8 |

EXAMPLE 8

A number of elastomers were prepared using ethoxylated tris-($\beta$-hydroxypropyl) isocyanurate (THEPIC) as the isocyanurate triol. This product has a molecular weight of 467,4 and an equivalent weight of 155.8. The elastomers were prepared by a hand casting technique. The THEPIC was blended with a polymeric polyol and the blend was evacuated in order to remove entrapped air and moisture. Thereafter the appropriate amount of 4.4'diisocyanatodiphenylmethane (MDI) was added to form a prepolymer. This prepolymer was then mixed with butanediol and the mixture was cast in a molden, cured in the mold at 100° C. for 30 minutes and post-cured for 16 hours at 100° C. Samples were conditioned for 7 days at 25° C. and 50% relative humidity before testing. The results are gathered in table 7. The components used were:

Experiment 8-1: prepolymer using 3 moles of MDI, 1 equivalent of THEPIC and 2 equivalents of poly(oxytetramethylene) glycol having mol weight of 980 and an equivalent weight of 490. An amount of butanediol producing a NCO/OH ratio of 1.05 was used.
Experiment 8-2: prepolymer using 4 moles of MDI, 2 equivalents of THEPIC and 2 equivalents of the same poly(oxytetramethylene)glycol, cured with butanediol at a NCO/OH ratio of 1.05.
Experiment 8-3: a prepolymer using 3 moles of MDI, 1 equivalent of THEPIC and 2 equivalents of a polyester glycol with a molecular weight of 2000 and an equivalent weight of 1000 (Multrathane R-144 of Mobay Chemical Corp). Again the prepolymer was cured with butanediol at a NCH/OH ratio of 1.05.
Experiment 8-4: a prepolymer using 4 moles of MDI, 2 equivalents of THEPIC and 2 equivalents of the same polyesterglycol, cured with butanediol at a NCO/OH ratio of 1.05.

TABLE 7

| elastomer | 8-1 | 8-3 | 8-3 | 8-4 |
|---|---|---|---|---|
| hardness, Shore A | 85 | 96 | 75 | 73 |
| tensile strength, 25° C. in N/mm$^2$ | 31.9 | 32.1 | 26.8 | 30.8 |
| modulus at 100% N/mm$^2$ | 2.83 | 10.2 | 1.8 | 2.1 |
| modulus at 300% N/mm$^2$ | 11.3 | — | 5.3 | 7.5 |
| elongation, % | 380 | 280 | 600 | 500 |

What is claimed is:

1. In a process for preparing a cross-linked polyurethane elastomer by reacting a polyisocyanate, at least one polyol, and at least one trihydroxy compound, optionally in the presence of a catalyst, the improvement wherein the hydroxyl compounds employed are:

A-1. a polymeric polyol compound having a molecular weight of between about 500 and about 10,000 and an average of 2 to 3 hydroxy groups per molecule; A-2. a dihydroxy compound having a molecular weight of between about 60 and about 200, in a quantity such that the ratio between the hydroxyl groups derived from the low molecular weight diol (A-2) and the hydroxyl groups derived from the polymeric polyol (A-1) is between about 0:1 and about 5:1; and B. tris-($\beta$-hydroxypropyl)-isocyanurate or ethoxylated tris($\beta$-hydroxypropyl)-isocyanurate such that the ratio between the hydroxyl groups derived from the isocyanurate and the hydroxyl groups derived from the sum of the polyols (A-1) and (A-2) is between about 0.5:1 and about 5:1.

2. The process according to claim 1, wherein the ratio between the hydroxyl groups derived from the tris-($\beta$-hydroxypropyl)-isocyanurate or its ethoxylated derivative and the hydroxyl groups derived from the sum of the polyols (A-1 and A-2) is between about 0.8:1 and about 3.5:1.

3. The process according to claim 1 or 2 wherein the polymeric polyol (A-1) is selected from the group consisting of polyoxyalkylene glycols composed of C$_2$ to C$_4$ oxyalkylene units, the addition products of a C$_2$ to C$_3$ alkene oxide of a trihydroxy compound, polyactone diols derived from C$_5$ to C$_{12}$ lactones, polylactone triols derived from C$_5$ to C$_{12}$ lactones, hydroxylterminated polyesters, polyacrylates containing hydroxyl groups and graft polymers containing hydroxyl groups having chains based on acrylonitrile and graft polymers containing hydroxyl groups having chains based on styrene.

4. The process according to claim 1 or 3 wherein an elastomeric polyurethane is prepared using a polymeric polyol (A-1) having a molecular weight between about 500 and about 2,500.

5. The process according to claim 4 wherein an elastomeric polyurethane is produced using an amount of tris-(β-hydroxypropyl)-isocyanurate or the ethoxylated derivative thereof such that the ratio of the hydroxyl groups derived from said isocyanurate triol and the hydroxyl groups derived from the other polyols is between about 1.0 and about 3.5, and the quantity of low molecular weight diol (A-2) used is such that the ratio between the hydroxyl groups derived from the (A-2) diol and the hydroxyl groups derived from the polymeric polyol (A-1) is about 0:1 to about 0.5:1.

6. The process according to claim 1 or 3 wherein said polyol (A-1) is a polymeric trihydroxyl compound having a molecular weight of between about 2,500 and about 10,000, and the quantity of said isocyanurate triol is such that the ratio between the hydroxyl groups derived from the polymeric trihydroxyl compound and the hydroxyl groups deriving from said isocyanurate triol (B) is between about 0.1:1 and about 1.0:1.

7. The process according to claim 6 wherein said polymeric trihydroxyl compound has a molecular weight of between about 4,000 and about 8,000.

8. A cross-linked polyurethane produced by the process of claim 1.

9. An elastomeric polyurethane produced by the process of claim 3.

10. In a process for preparing a microcellular polyurethane foam by reacting a polyisocyanate, at least one polyol, and at least one trihydroxy compound, optionally in the presence of a catalyst, the improvement wherein the hydroxyl compounds employed are:

A-1. a polymeric polyol compound having a molecular weight of between about 500 and about 10,000 and an average of 2 to 3 hydroxy groups per molecule;

A-2. a dihydroxy compound having a molecular weight of between 60 and about 200, and present in an amount such that the ratio between the hydroxyl groups derived from the diol (A-2) and the hydroxyl groups derived from the polymeric polyol (A-1) is between about 0.5:1 and about 3:1; and B. tris-(β-hydroxypropyl)-isocyanurate or ethoxylated tris(β-hydroxypropyl)-isocyanurate such that the ratio between the hydroxyl groups derived from the isocyanurate and the hydroxyl groups derived from the sum of the polyols (A-1 and A-2) is between about 0.5:1 and about 5:1.

11. The process for preparing a microcellular polyurethane foam according to claim 10 wherein the ratio between the hydroxyl groups derived from the diol (A-2) and the hydroxyl groups derived from the polymeric polyol (A-1) is between about 1.0:1 and 2.0:1.

12. The process for preparing a microcellular polyurethane foam according to claim 10 or 11 wherein the polymeric polyol (A-1) is selected from the group consisting of polyoxyalkylene glycols composed of $C_2$ to $C_4$ oxyalkylene units, the addition products of a $C_2$ to $C_3$ alkene oxide of a trihydroxy compound, polylactone diols derived from $C_5$ to $C_{12}$ lactones, polylactone triols derived from $C_5$ to $C_{12}$ lactones, hydroxylterminated polyesters, polyacrylates containing hydroxyl groups and graft polymers containing hydroxyl groups having chains based on acrylonitrile and graft polymers containing hydroxyl groups having chains based on styrene.

13. The process for preparing a microcellular polyurethane foam according to claim 10 wherein a cross-linked microcellular polyurethane having a density of at least 200 kg/m$^3$ is produced by conducting said reaction in the presence of a blowing agent, and the ratio of the hydroxyl groups derived from said isocyanurate triol and the hydroxyl groups derived from the sum of the polyols A-1 and A-2 is between about 0.8:1 and about 2.5:1.

14. The process for preparing a microcellular polyurethane foam according to claim 13 wherein said cross-linked microcellular polyurethane has a density of at least 200 kg/cm$^3$.

15. The process for preparing a microcellular polyurethane foam according to claim 14 wherein said cross-linked microcellular polyurethane has a density of at least 400 kg/cm$^3$.

16. The process for preparing a microcellular polyurethane foam according to claim 13 wherein the ratio of the hydroxyl groups derived from the low molecular weight diol and the hydroxyl groups derived from the polymeric polyol are both between about 1:1 and about 2:1; and the ratio between the hydroxyl groups derived from said isocyanurate and the hydroxyl groups derived from the sum of the polyols (A-1 and A-2) are both between about 1:1 and about 2:1.

17. The process for preparing a microcellular polyurethane foam according to claim 10 wherein said polyol (A-1) is a polymeric trihydroxyl compound having a molecular weight of between about 2,500 and about 10,000, and the quantity of said isocyanurate triol is such that the ratio between the hydroxyl groups derived from the polymeric trihydroxyl compound and the hydroxyl groups deriving from said isocyanurate triol (B) is between about 0.1:1 and about 1.0:1.

18. The process for preparing a microcellular polyurethane foam according to claim 17 wherein said polymeric trihydroxyl compound has a molecular weight of between about 4,000 and about 8,000.

19. A cross-linked microcellular polyurethane having a density of at least 200 kg/cm$^3$ produced by the process of claim 13.

* * * * *